United States Patent
Hulick, Jr.

(10) Patent No.: US 10,372,586 B2
(45) Date of Patent: Aug. 6, 2019

(54) APPLICATION INSTRUMENTATION CODE EXTENSION

(71) Applicant: BMC SOFTWARE, INC., Houston, TX (US)

(72) Inventor: Walter T. Hulick, Jr., Pearland, TX (US)

(73) Assignee: BMC Software, Inc., Houston, TX (US)

( * ) Notice: Subject to any disclaimer, the term of this patent is extended or adjusted under 35 U.S.C. 154(b) by 48 days.

(21) Appl. No.: 15/005,550

(22) Filed: Jan. 25, 2016

(65) Prior Publication Data

US 2016/0217057 A1     Jul. 28, 2016

Related U.S. Application Data

(63) Continuation of application No. 13/457,189, filed on Apr. 26, 2012, now Pat. No. 9,251,026.

(Continued)

(51) Int. Cl.
    *G06F 11/36*        (2006.01)
    *G06F 9/445*        (2018.01)
    (Continued)

(52) U.S. Cl.
    CPC ...... *G06F 11/3612* (2013.01); *G06F 9/44526* (2013.01); *G06F 11/302* (2013.01);
    (Continued)

(58) Field of Classification Search
    CPC .................... G06F 11/3612; G06F 11/3466
    (Continued)

(56) References Cited

U.S. PATENT DOCUMENTS

| | | | | |
|---|---|---|---|---|
| 7,281,242 B2 * | 10/2007 | Inamdar | ................ | G06F 11/362 |
| | | | | 714/38.1 |
| 8,032,861 B2 * | 10/2011 | Fernando | .................. | G06F 8/24 |
| | | | | 717/120 |

(Continued)

OTHER PUBLICATIONS

Non-Final Office Action received for U.S. Appl. No. 13/457,189, dated Feb. 13, 2014, 14 pages.

(Continued)

*Primary Examiner* — Chat C Do
*Assistant Examiner* — Bradford F Wheaton
(74) *Attorney, Agent, or Firm* — Brake Hughes Bellermann LLP

(57) ABSTRACT

The embodiments provide an application diagnostics apparatus including an instrumentation engine configured to monitor one or more methods of a call chain of the application in response to a server request according to an instrumentation file specifying which methods are monitored and which methods are associated with a code extension, an extension determining unit configured to determine that at least one monitored method is associated with the code extension based on code extension identification information, a class loading unit configured to load the code extension from a resource file when the at least one monitored method associated with the code extension is called within the call chain, a code extension execution unit configured to execute one or more data collection processes, and a report generator configured to generate at least one report for display based on collected parameters.

19 Claims, 5 Drawing Sheets

Related U.S. Application Data

(60) Provisional application No. 61/618,755, filed on Mar. 31, 2012.

(51) Int. Cl.
*G06F 11/34* (2006.01)
*G06F 11/30* (2006.01)
*G06F 11/32* (2006.01)

(52) U.S. Cl.
CPC ........ *G06F 11/3093* (2013.01); *G06F 11/321* (2013.01); *G06F 11/3495* (2013.01); *G06F 11/3466* (2013.01); *G06F 2201/865* (2013.01); *G06F 2201/875* (2013.01)

(58) Field of Classification Search
USPC ........................................................ 717/130
See application file for complete search history.

(56) References Cited

U.S. PATENT DOCUMENTS

| | | | | |
|---|---|---|---|---|
| 8,112,379 | B2* | 2/2012 | Voskuil | G06N 5/022 434/118 |
| 8,200,962 | B1* | 6/2012 | Boodman | G06F 21/53 713/161 |
| 8,341,648 | B1 | 12/2012 | Cook | |
| 9,251,026 | B2 | 2/2016 | Hulick | |
| 2005/0060698 | A1* | 3/2005 | Boykin | G06F 9/44526 717/166 |
| 2008/0126326 | A1* | 5/2008 | Potter | G06F 9/4448 |
| 2009/0259986 | A1* | 10/2009 | Bui | G06F 8/36 717/104 |
| 2010/0005449 | A1* | 1/2010 | Karabulut | G06F 21/52 717/120 |
| 2010/0011351 | A1* | 1/2010 | Tsvi | G06F 3/0607 717/174 |
| 2010/0050162 | A1* | 2/2010 | Alkins | G06F 11/3471 717/128 |
| 2011/0061041 | A1 | 3/2011 | Hellebro et al. | |
| 2011/0113407 | A1* | 5/2011 | Mariani | G06F 11/3409 717/130 |
| 2012/0102483 | A1* | 4/2012 | Goldman | G06F 8/36 717/174 |
| 2012/0151450 | A1 | 6/2012 | Saffer et al. | |
| 2013/0007147 | A1* | 1/2013 | Toga | G06Q 10/107 709/206 |
| 2013/0145349 | A1* | 6/2013 | Basak | G06F 9/44505 717/121 |
| 2013/0263096 | A1 | 10/2013 | Hulick | |
| 2014/0041016 | A1 | 2/2014 | Chanda et al. | |

OTHER PUBLICATIONS

Response to Non-Final Office Action for U.S. Appl. No. 13/457,189, filed on May 13, 2014, 13 pages.
Final Office Action received for U.S. Appl. No. 13/457,189, dated Oct. 2, 2014, 19 pages.
Response to Final Office Action for U.S. Appl. No. 13/457,189, filed on Dec. 23, 2014, 12 pages.
Advisory Action Received for U.S. Appl. No. 13/457,189, dated Feb. 2, 2015, 4 pages.
Non-Final Office Action received for U.S. Appl. No. 13/457,189, dated Mar. 16, 2015, 19 pages.
Response to Non-Final Office Action for U.S. Appl. No. 13/457,189, filed on Jun. 16, 2015, 11 pages.
Notice of Allowance received for U.S. Appl. No. 13/457,189, dated Sep. 25, 2015, 15 pages.

\* cited by examiner

APPLICATION INSTRUMENTATION CODE EXTENSION

CROSS-REFERENCE TO RELATED APPLICATIONS

This application is a Continuation of, U.S. patent application Ser. No. 13/457,189, filed on Apr. 26, 2012, which claims priority to U.S. Provisional Patent Application Ser. No. 61/618,755, filed on Mar. 31, 2012, which applications are hereby incorporated by reference in their entireties.

TECHNICAL FIELD

The present disclosure relates generally to application monitoring.

BACKGROUND

In most cases, a relatively large concern for customer facing Internet based applications (e.g., banking, retail, services) is the quality of service and/or end user experience for their customers. This service generally translates into server requests, e.g., associated with web-based applications, which are the entry points for customer-based transactions, and generally impact a company's ability to generate revenue. Currently, there are a number of methods that may monitor the performance of such web-based applications. However, most conventional monitoring products have a fixed set of instrumentation that is applied to measuring the round trip (and associated dependencies) for an individual server request. For example, a monitoring product may measure the incremental flow through the actual application method calls that service that request. The classes containing the method calls are generally instrumented in such a way that the instrumentation (which is inserted for interception) is called when the method is entered and called when the method is exited. The instrumentation in most cases is based on a descriptive file (e.g., instrumentation file, recording file, etc.) that essentially identifies the particular classes and methods to be monitored, as well as how they should be handled and what information should be collected.

However, in the event that the customer wishes to change the instrumentation and/or has a new set of customized methods that the customer wishes to monitor, implementing dynamic/custom changes in a timely manner without affecting the application is a difficult challenge. For example, in order to deploy a customized change to the underlying instrumentation, the application may have to be shut down for a lengthy period of time, which may be cost prohibitive and/or disadvantageous when assisting customers who desire to minimize downtime (e.g., some restarts can be excess of 45 minutes to complete). Further, making changes to the underlying instrumentation is a complex process that requires a relatively significant amount of time to implement, and often involving a highly skilled person with an in-depth understanding of the instrumentation product and/or the underlying server application.

SUMMARY

Embodiments provide an application diagnostics apparatus for monitoring performance of an application executing on an application server. The application diagnostics apparatus includes at least one processor and a non-transitory computer-readable storage medium including instructions executable by the at least one processor. The instructions are configured to implement an instrumentation engine configured to monitor one or more methods of a call chain of the application in response to a server request according to an instrumentation file. The instrumentation file specifies which methods are monitored and which methods are associated with a code extension. The instructions are configured to implement an extension determining unit configured to determine that at least one monitored method is associated with the code extension based on code extension identification information being included in the instrumentation file, a class loading unit configured to load the code extension from a resource file storing a plurality of code extensions using the code extension identification information when the at least one monitored method associated with the code extension is called within the call chain, a code extension execution unit configured to execute one or more data collection processes specified by the code extension at an exit point of the at least one monitored method including obtaining at least one parameter related to the at least one monitored method, and a report generator configured to generate at least one report for display based on the obtained at least one parameter.

The application diagnostics apparatus also includes a code extension updating unit configured to update the code extension or add one or more new code extensions based on information received via a code extension interface. In one embodiment, the code extension updating unit is configured to update the code extension or add the one or more new code extensions without restarting the application.

The instrumentation engine configured to monitor one or more methods of a call chain of the application in response to a server request according to an instrumentation file may include intercepting the one or more methods according to the instrumentation file, interjecting code at entries and exits of the one or more methods, and monitoring the one or more methods in response to the server request during runtime of the call chain.

According to one embodiment, the instrumentation file may include a plurality of rules, and each rule specifies at least one method to be monitored. At least one of the rules may include information identifying the at least one monitored method, tier information identifying which tier the at least one monitored method is located, signature information, and the code extension identification information. The code extension identification information includes information identifying the code extension and location information specifying the resource file.

The class loading unit may be configured to load the code extension from the resource file using a same class loader that was used to load the application. According to an embodiment, the class loading unit may be configured to rename a class associated with code extension to a unique class name, and call the same class loader that was used to load the application. The at least one parameter may include an argument and return value of the at least one monitored method.

The report generator may include a parameter map generator configured to generate a parameter map based on the obtained at least one parameter, where the parameter map includes at least one key-value pair representing a parameter and associated value, and an analysis unit configured to analyze the parameter map and generate the at least one report based on the analyzed parameter map.

The embodiments provide a method for monitoring performance of an application executing on an application server performed by one or more processors. The method may include monitoring one or more methods of a call chain of the application in response to a server request according to an instrumentation file, where the instrumentation file specifies which methods are monitored and which methods are associated with a code extension, determining that at least one monitored method is associated with the code extension based on code extension identification information being included in the instrumentation file, loading the code extension from a resource file storing a plurality of code extensions using the code extension identification information when the at least one monitored method associated with the code extension is called within the call chain, executing one or more data collection processes specified by the code extension at an exit point of the at least one monitored method including obtaining at least one parameter related to the at least one monitored method, and generating at least one report for display based on the obtained at least one parameter.

The method may further include updating the code extension or adding one or more new code extensions based on information received via a code extension interface. According to one embodiment, the updating/adding step may update the code extension or adds the one or more new code extensions without restarting the application.

The instrumentation file may include a plurality of rules, and each rule may specify at least one method to be monitored. At least one of the rules may include information identifying the at least one monitored method, tier information identifying which tier the at least one monitored method is located, signature information, and the code extension identification information.

In one embodiment, the loading step may load the code extension from the resource file using a same class loader that was used to load the application. Also, the generating step may include generating a parameter map based on the obtained at least one parameter, where the parameter map includes at least one key-value pair representing a parameter and associated value, and generating the at least one report based on the parameter map.

The embodiments provide a non-transitory computer-readable medium storing instructions that when executed cause one or more processors to perform a monitoring process. The instructions comprising instructions to monitor one or more methods of a call chain of the application in response to a server request according to an instrumentation file, where the instrumentation file specifies which methods are monitored and which methods are associated with a code extension, determine that at least one monitored method is associated with the code extension based on code extension identification information being included in the instrumentation file, load the code extension from a resource file storing a plurality of code extensions using the code extension identification information when the at least one monitored method associated with the code extension is called within the call chain, execute one or more data collection processes specified by the code extension at an exit point of the at least one monitored method including obtaining at least one parameter related to the at least one monitored method, and generate at least one report for display based on the obtained at least one parameter.

The instructions may include instructions to update the code extension or add one or more new code extensions based on information received via a code extension interface. In one embodiment, the code extension(s) is/are updated or added without restarting the application.

DESCRIPTION OF EXAMPLE EMBODIMENTS

Figure 1:
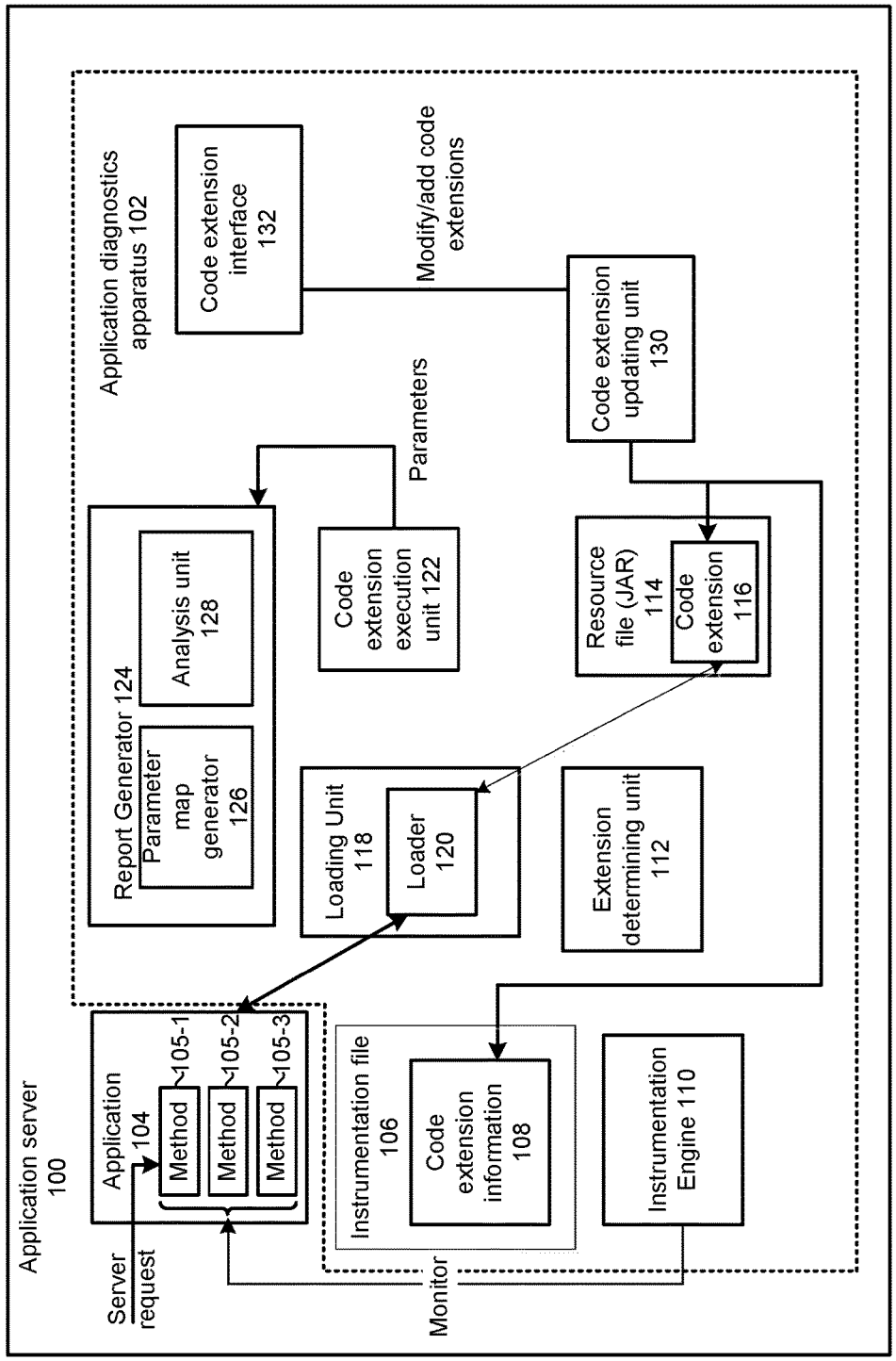
FIG. 1 illustrates an application diagnostics apparatus for monitoring performance of application executing on an application server according to an embodiment.

The embodiments provide an application diagnostics apparatus for monitoring performance of an application executing on an application server. The application diagnostics apparatus allows a user to dynamically extend the functionality of an application diagnostics module without requiring the application to be restarted and alter the monitoring effectiveness with "surgical" precision. The extension of the application diagnostics module may be implemented via one or more code extensions within an instrumentation file. The instrumentation file may specify, in part, which methods are monitored and which methods are associated with the code extension. The code extension itself provides the logic for performing one or more data collection processes such as the capturing of parameters (e.g., key parameter indicators (KPIs)) as well as potentially altering the application flow itself during runtime of the application. The code extensions may be able to dynamically insert themselves into the application in an accurate manner (e.g., loaded with an appropriate class loader) without the need to restart the application. Also, developers of the code extensions do not necessarily have to have in-depth knowledge of the instrumentation product. Rather, the development of the code extensions may be accomplished via an extensions code interface, and, when implemented, may permit virtually any programmer with sufficient domain knowledge to create and maintain the code extensions without requiring in-depth knowledge of the inner workings of the instrumentation engine, which is generally the most complex part of these types of products.

Furthermore, because the modification or the addition of code extensions do not require application restart (e.g., some applications may take over 45 minutes to restart) and the development of the code extension may not require in-depth knowledge of the underlying instrumentation, the amount of time required to make a change/modification/addition from proof of concept (POC) to development may be significantly decreased. The data collection processes specified by the code extensions may obtain valuable information regarding the operations of the methods calls initiated by the server requests, which may be actual new KPIs or contextual information specific to such methods. This information may be analyzed and presented to the user in the form of reports that may provide useful insight in evaluating the performance of an application such as the amount of time to execute certain method calls, the arguments and/or return values for the methods calls, and/or other information (e.g., the latencies within each tier of an application and other server performance metrics). In short, the application diagnostics apparatus may have the ability to provide customized instrumentation (e.g., code extensions) that are implemented on the fly without requiring in-depth expertise of the instrumentation product and without being invasive to the operation of the application.

FIG. 1 illustrates an application diagnostics apparatus 102 for monitoring performance of application 104 executing on an application server 100 according to an embodiment. The application server 100 may include an application 104 that performs a series of methods 105 such as method 105-1, method 105-2 and method 105-3, for example. The application 104 may be executing on an operating system of the application server 100, and may be any type of application that provides a service, such as internet-based web applications in the areas of banking, retail and/or any other type of business area. In one embodiment, the application 104 may be a Java EE (J2EE) or .Net based application.

The application server 100 may include the application diagnostics apparatus 102 configured to monitor the performance of the application 104 executing on the application server 100. For example, the application 104 may receive a server request that starts or prompts the execution of the methods 105 according to a call chain initiated by the server request. The server requests may be in the form of general Hypertext Transfer Protocol (HTTP) posts, Java Message Service (JMS) messaging, or Representational State Transfer (REST)/Remote Procedure Calls (RPC) based web service requests, and are, generally, the entry points into the application 105. In one example, the server request may be a login to a banking transaction, for example.

The application diagnostics apparatus 102 may monitor the performance of the application 104, such as the entries into the methods 105 and the exits out of the methods 105, and create a call chain including the methods which were entered and exited in the course of the server request. Generally, the application diagnostics apparatus 102 may measure the amount of time spent in each part of the call chain, and collect information regarding the specific attributes of each part of the application that was utilized by the called methods 105. In particular, the application diagnostics apparatus 102 may capture/collect KPIs, metrics and/or properties that occur within the call chain initiated by the server request. From this information, the application diagnostics apparatus 102 may generate one or more reports (and or SLA alerts) analyzing the performance of the application 104.

The application diagnostics apparatus 102 may include an instrumentation file 106, an instrumentation engine 110, an extension determining unit 112, a resource file 114, a code extension execution unit 122, a report generator 124, a code extension updating unit 130, and a code extension interface 132. Also, the application diagnostics apparatus 102 may include other components that are well known to one of ordinary skill in the art.

The instrumentation engine 110 may monitor one or more methods 105 of a call chain of the application 104 in response to the server request according to the instrumentation file 106. The instrumentation file 106 may include information that specifies which methods are monitored. In some examples, the instrumentation file 106 may also be referred to as a recording file, rules file, or a points file. The instrumentation engine 110 may intercept the one or more methods 105 according to instructions specified in the instrumentation file 106, interject code at entries and exits of the one or more methods 105, and monitor the one or more methods 105 during runtime of the call chain, which may include the capture/collection of parameters related to the specified methods 105. According to the embodiments, the instrumentation file 106 may also include code extension information 108 specifying which methods 105 are associated with a code extension. The code extension 116 itself provides, in part, the logic for performing one or more data collection processes such as the capturing of parameters (e.g., key parameter indicators (KPIs)) as well as potentially altering the application flow itself. In addition, the code extension 116 may provide the ability to change a user interface associated with the application 104.

According to the embodiments, the instrumentation file 106 associates the code extension with a particular rule, which controls which methods 105 should be instrumented/collected at runtime. The instrumentation file 106 may include a plurality of rules, and each rule may specify one or more methods 105 to be monitored. An example portion of the instrumentation file 106 is illustrated below.

```

# Servlets Service

<GenericServlet>
tier=web
containsclass=javax.servlet.http.HttpServlet
method=doPost,doGet
signature=(Ljavax/servlet/http/HttpServletRequest;Ljavax/servlet/http/
HttpServletResponse;)V
snapin=com.bmc.aps.agent.trace.ServletMethodParameterSnapin@
snapins-adops.jar
modifiers=deep,entrypoint,priority:2
```

The above example illustrates a single rule (e.g., GenericServlet) included in the instrumentation file 106. However, the instrumentation file 106 may include any number of rules. At least some of the rules may be associated with the code extension 116, as illustrated in the above example (e.g., referred as a "snapin"). For example, a rule may specify one or more methods 105 to be monitored, class information specifying the class associated with the one or more methods 105, tier information identifying which tier the one or more methods 105 are located, signature information, the code extension information 108, and one or more modifiers. Referring to the above example, the GenericServlet rule includes the tier information (e.g., tier=1), the class information (e.g., containsclass=javax.servlet.http.HttpServlet), the methods to be monitored (e.g., doPost and doGet), signature information (e.g., Ljavax/serlet/http/HttpServletRequest;Ljavax/servlet/http/HttpServletResponse;), the code extension information 108 (e.g., snapin= com.bmc.aps.agent.trace.ServletMethodParameter-Snapin@snapins-adops.jar), and the modifiers (e.g., deep, entrypoint,priority:2).

In more detail, the code extension information 108 may include information identifying the code extension (e.g., ServletMethodParameterSnapin) and location information specifying the resource file 114 (@snapins-adops.jar). The resource file 114 may be a designated source archive that stores a plurality of code extensions 116. In one embodiment, the resource file 114 may be a Java Archive (JAR) file. The code extensions 116 may be stored in the resource file 114 in such a manner that the code extensions 116 are autonomous. In other words, the code extensions 116 are not dependent on any other information stored in the resource file 114. For example, the resource file 116 may also include customer information or any other type of information commonly stored in a JAR file. However, the code extensions 116 are packaged in the resource file 114 such that they are not dependent on any other information contained in the resource file 116.

The methods 105 (e.g., doPost and doGet) should contain the identified signature information, and the modifiers place limits on the implementation rule. For example, the modifier "deep" refers to the action of searching through all inherited classes of the identified methods 105. For instance, if the rule did not contain the modifier "deep", the instrumentation engine 110 may only look at the initial class being evaluated. Also, the modifiers may include priority information (e.g., priority:2), which indicates the priority of the rule. For example, as indicated above, there may be a number of different rules specifying different methods to be monitored. As such, two or more rules may apply to the same method. The instrumentation engine 110 may select one of the rules based on the priority information provided by the modifiers. The above described modifiers are merely examples, where the embodiments encompass many different types and variations of modifying instruments that place limits on the implementation rule.

When the application 104 is loaded, the instrumentation engine 110 may review every class associated with the methods 105 of the application 104, and if one or more of the rules apply to the loaded class, the instrumentation engine 110 instruments the specified methods 105 by inserting code at the entries and exits of the specified methods 105. The loading unit 118 may utilize an appropriate loader 120 for loading the various classes of the application 104 as specified by the methods 105. When the loader 120 loads the classes corresponding to the respective method 105, the instrumentation engine 110 may review the loaded classes, and if one or more of the rules applies to the loaded class, the instrumentation engine 110 may instrument the specified methods 105 by inserting code at the entries and exits of the specified methods 105.

Thereafter, during runtime of the application 104 (e.g., after it has been loaded), the application 104 proceeds to call the appropriate methods 105 by the call chain instituted by the server request. During runtime, an extension determining unit 112 may be configured to determine that the one or more methods 105 specified in the rule are associated with the code extension 116 based on the code extension information 108. For example, if the rule includes the code extension information 108, the extension determining unit 112 determines that the one or more specified methods 105 are associated with the code extension 116. Thereafter, the loading unit 118 dynamically loads the code extension 116 from the resource file 114, and the code extension execution unit 122 may carry out one or more data collection processes as specified by the code extension 116, as further described below.

Also, it is noted that the extension determining unit 112 may determine that a particular method identified in the instrumentation file 106 is not associated with the code extension 116. In this case, the instrumentation engine 110 may perform basic instrumentation functionalities associated with the identified method such as the collection of parameters and the timing associated with each identified method. However, the code extension 116 provides the ability for the application diagnostics apparatus 102 to collect additional parameters above and beyond the basic instrumentation such as the ability to derive new KPIs. Further, it is also noted that not every method within the call chain is instrumented. For instance, the instrumentation file 106 usually specifies which method an owner/operator of the application 104 is interested.

The loading unit 118 may load the code extension 116 from the resource file 114 using the code extension information 108 when the monitored one or more methods 105 are called within the call chain. For example, the loading unit 118 loads the code extension 116 specified by the code extension information 108. In one embodiment, the loading unit 118 may be configured to determine which loader was used to load the application 104, and select the same loader (e.g., loader 120) to load the code extension 116 from the resource file 114. As a result, the code extension 116 may be loaded into the proper location in order to ensure that the application 104 continues to execute in a proper manner.

According to one embodiment, the loading unit 118 may use one or more techniques in order to bypass class loading delegation. Class loading delegation refers to the action of delegating downstream in order to locate a certain class. For example, the application 104 may be associated with a number of hierarchical class loaders in the order of a boot class loader, an extensions class loader, an application class loader, and a WAR class loader. If the application is using the WAR class loader and a request for a class is received, the WAR class loader will delegate downstream to the boot class loader. Then, the boot class loader will attempt to locate the class, and if a match was not found, the next class loader in the hierarchy (e.g., the extensions class loader) will attempt to locate the class. This process is repeated until reaching the WAR class loader. For example, if none of the parents to the requested loader finds a match, the requested class loader will be used to load the class.

In order to prevent class loading delegation, according to one technique, the class loading unit 118 may be configured to rename a class associated with the code extension 116 to a unique class name. For example, by giving the class a unique name, one or more parent class loaders will never find a match to the class name. As such, the requested class loader will always be used to load the extension. According to another technique, the class loading unit 118 may directly call the same class loader 120 that was used to load the application 104 (e.g., found by traversing the original class data structure) after directly loading the re-named class into the loader 120. As a result, bypass delegation may be prevented, which ensures that the loaded code extension 116 is loaded into same class loader as the class being instrumented which insures proper access to that classes internal and referenced classes.

Once loaded, a code extension execution unit 122 may be configured to execute one or more data collection processes specified by the code extension 116 at an exit point of the one or more monitored methods 105. Although the code extension execution unit 122 (and extension determining unit 112) is illustrated as a separate logic block from the instrumentation engine 110, the code extension execution unit 122 (and extension determining unit 112) may be included in, or otherwise associated with, the instrumentation engine 110. The one or more data collection processes may include obtaining one or more parameters associated with the one or more monitored methods 105. For example, the code extension execution unit 122 may collect KPIs, parameters, attributes, and/or other information related to the monitored methods 105. The collected KPIs/parameters/attributes may include the arguments and return values associated with the monitored methods. Also, it is noted that the code extension execution 122 is configured to collect the parameters at the exit point of the monitored methods 105 in order to process the return values of the called methods. From the arguments and return values, new information such as KPIs may be derived or created, which may provide insight into how the application 104 is performing. Although the code extension 116 has been described with reference to a somewhat generic code extension 116, each code extension 116 is specific to the type of environment of the executed method(s) and well as the type of server request.

As such, the collected parameters may encompass virtually any type of parameter associated with the called methods.

The code extension updating unit 130 may be configured to update the code extension 116 and/or add one or more new code extensions based on information received from the code extension interface 132. In one embodiment, the code extension updating unit 130 may be configured to update the code extension or add the one or more new code extensions without restarting the application. For example, the code extension 116 may be conformed to the code extension interface 132, and, when implemented, permits a developer to change/modify/delete/add one or more code extensions 116. An example code extension interface 132 is illustrated below.

```
public static interface IMethodParameterSnapin {
    public java.util.Map
executeMethodParameterSnapin(Class clazz,String methodName,Object inst,Object ret,Object[ ] args,Map snapinServerRequestMap,Map snapinUniversalMap, Throwable t);
    public String dumpSnapin(Class clazz,String methodName,Object inst,Object ret,Object[ ] args,Map snapinServerRequestMap,Map snapinUniversalMap);
    public String dumpMap(Map map);
    public boolean
init(RecordingRuleHandler.RecordingRule iRule,boolean snapinDebug);
    public RecordingRuleHandler.RecordingRule getRule( );
    public String getEntryPointName(String className,String methodName,Object[ ] webArgs);
```

The above example relates to a code extension 116 called "IMethodParameterSnapin." The example code extension interface 132 provides the code in order to update the code extensions 116 in the resource file 114 as well as the code extension information 108 in the instrumentation file 106. Basically, the code extension interface 132 describes the capabilities of the code extension 116.

Generally, the code extension execution unit 122 includes an ability to use the arguments and/or return values to create key parameters on the fly. These parameters may be transferred to the report generator 124 for further processing. The report generator 124 may be configured to generate one or more reports based on the obtained parameters. For example, the report generator 124 may include a parameter map generator 126 and an analysis unit 128. The parameter map generator 126 may be configured to generate a parameter map based on the obtained parameters. In one embodiment, the parameter map may include a number of key-value pairs, where each key-value pair represents a collected parameter and associated value. For example, the parameter map generator 126 may be configured to populate a parameter map with the parameters obtained by the code extension execution unit 122. The analysis unit 128 may be configured to analyse the parameter map and generate one or more reports based on the analysed parameter map. The one or more reports may be provided to a user interfere for display such as the code extension interface 132. The reports are further illustrated with respect to FIGS. 3-5.

As indicated above, the actual contents of the code extension 116 can widely vary depending on the application component being used to execute the specified method (e.g., database call) and the type of server request. However, a specific example of the code extension 116 is provided below.

```
//
// Handle Company Specific HTTP Communications for EDI (Electronic Data
Interchange)-AcmeBank
//
    public class ACME_EDI_MethodParameterSnapin extends
BaseMethodParameterSnapin
    {
    //
    // Constructor - to set Logging Class for Snapin
    //
        public ACME_EDI_MethodParameterSnapin( )
        {
        super("ACME_EDI ");
        }
    //
    // Entry Point-it's a Servlet accepting REST parameters
    //
        public java.util.Map executeMethodParameterSnapin(Class clazz,
java.lang.reflect.Method methodObject, Object inst, Object ret, Object[ ] args, Map
snapinServerRequestMap, Map snapinUniversalMap, Throwable t)
        {
            javax.servlet.http.HttpServletRequest
req=(javax.servlet.http.HttpServletRequest)args[0];
            javax.servlet.http.HttpServletResponse
res=(javax.servlet.http.HttpServletResponse)args[1];
    //
    // Find out something about the user for our marketing department
    //
            ParametersMap parametersMap = ParametersMap
parametersMap = new ParametersMap( );
            parametersMap.add("ClientType", req.getHeader("user-
agent"));
            parametersMap.add("ClientIP", req.getRemoteUser( ));
    //
    // Find out the origin of the client, flag certains clients for our security department
    //
            parametersMap.add("RedFlag",
isSuspicious(req.getRemoteUser( ));
    //
    // get the Transaction Name and Id
    //
```

```
            parametersMap.add("TransId", req.getParameter("TransId"));
            parametersMap.add("TransName",
req.getParameter("TransName"));
    //
    // get the Source and Destinations Account
    //
            parametersMap.add("Source",
req.getParameter("SourceBank"));
            parametersMap.add("Destination",
req.getParameter("DestBank"));
    //
    // Transfer Time
    //
            parametersMap.add("TransferTime",
req.getParameter("TransferTimeGMT"));
            return parametersMap;
        }
    //
    // Name the entry Point
    //
            public EntryPointRulesHandler.EntryPointObject
getEntryPointInfo(String entryPointPrefix,String className,String
methodName,Object[ ] webArgs)
            {
            javax.servlet.http.HttpServletRequest
req=(javax.servlet.http.HttpServletRequest)webArgs[0];
            javax.servlet.http.HttpServletResponse
res=(javax.servlet.http.HttpServletResponse)webArgs[1];
        return req.getParameter("TransName")+req.getParameter("TransId");
            }
    }
```

Figure 2:
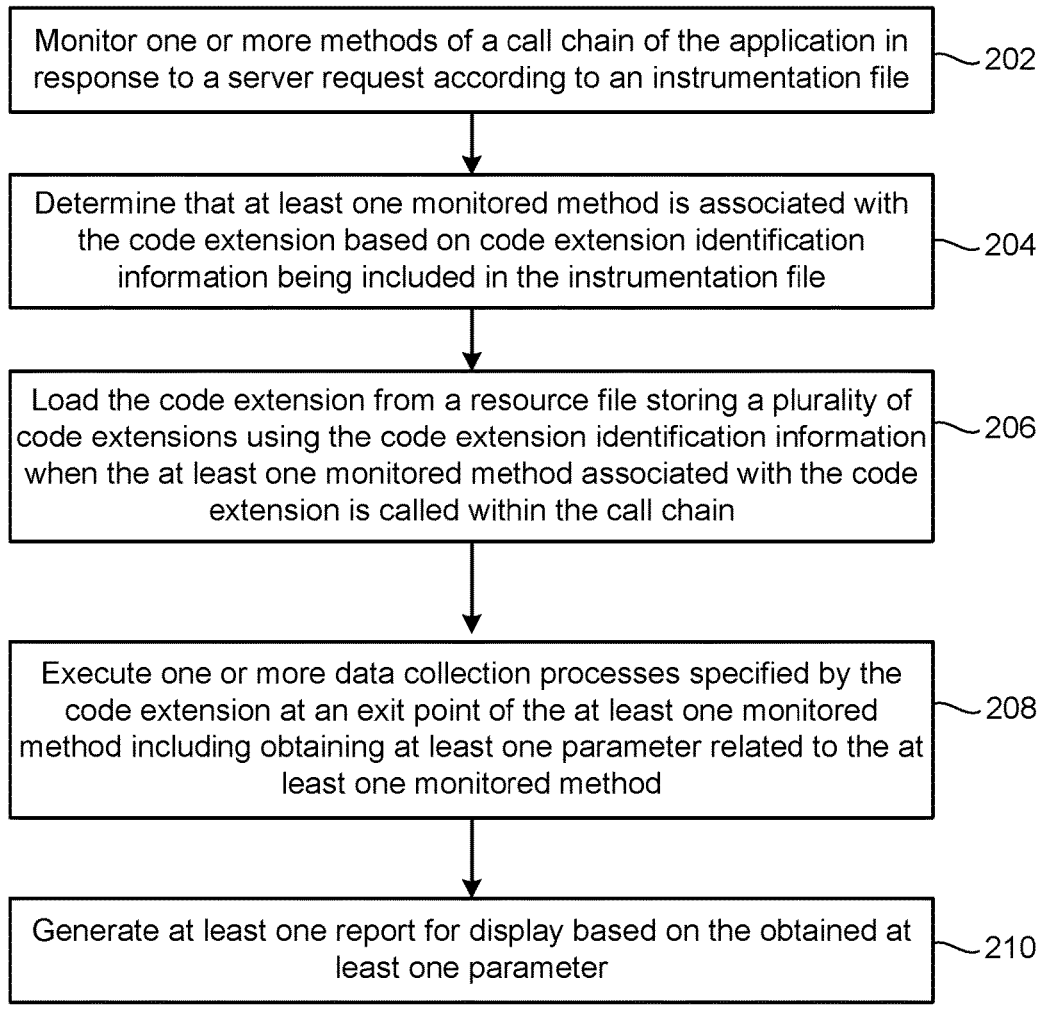
FIG. 2 is a flowchart illustrating example operations of the application diagnostics apparatus of FIG. 1 according to an embodiment.

FIG. 2 is a flowchart illustrating example operations of the application diagnostics apparatus 102 of FIG. 1 according to an embodiment. Although FIG. 2 is illustrated as a sequential, ordered listing of operations, it will be appreciated that some or all of the operations may occur in a different order, or in parallel, or iteratively, or may overlap in time.

One or more methods of a call chain of the application may be monitored in response to a server request according to an instrumentation file (202). For example, the instrumentation engine 110 may monitor one or more methods 105 of a call chain of the application 104 in response to the server request according to the instrumentation file 106. The instrumentation file 106 may include information that specifies which methods are monitored. The instrumentation engine 110 may intercept the one or more methods 105 according to instructions specified in the instrumentation file 106, interject code at entries and exits of the one or more methods 105, and monitor the one or more methods 105 during runtime of the call chain, which may include the capture/collection of parameters related to the specified methods 105. According to the embodiments, the instrumentation file 106 may also include the code extension information 108 specifying which methods 105 are associated with a code extension. The code extension 116 itself provides, in part, the logic for performing one or more data collection processes such as the capturing of parameters (e.g., key parameter indicators (KPIs)) as well as potentially altering the application flow itself.

At least one monitored method may be determined as being associated with the code extension based on code extension identification information being included in the instrumentation file (204). During runtime, the extension determining unit 112 may be configured to determine that the one or more methods specified in the rule(s) in the instrumentation file 106 are associated with the code extension 116 based on the code extension information 108. For example, if the rule(s) include(s) the code extension information 108, the extension determining unit 112 determines that the one or more specified methods are associated with the code extension 116.

The code extension may be loaded from a resource file storing a plurality of code extension using the code extension identification information when the at least one monitored method associated with the code extension is called within the call chain (206). The loading unit 118 may load the code extension 116 from the resource file 114 using the code extension information when the monitored one or more methods 105 are called within the call chain. For example, the loading unit 118 may load the code extension 116 specified by the code extension information 108. In one embodiment, the loading unit 118 may be configured to determine which loader was used to load the application 104, and select the same loader (e.g., loader 120) to load the code extension 116 from the resource file 114. As a result, the code extension 116 may be loaded into the proper location in order to ensure that the application 104 continues to execute in a proper manner.

One or more data collection processes specified by the code extension may be executed at an exit point of the at least one monitored method (208). Once loaded, a code extension execution unit 122 may be configured to execute one or more data collection processes specified by the code extension 116 at an exit point of the one or more monitored methods 105. The one or more data collection processes may include obtaining one or more parameters associated with the one or more monitored methods 105. For example, the code extension execution unit 122 may collect KPIs, parameters, attributes, and/or other information related to the specified methods 105. The collected KPIs/parameters/attributes may include the arguments and return values associated with the monitored methods 105. From the arguments and return values, new information such as KPIs may be derived or created, which may provide insight into how the application 104 is performing. However, generally, the collected parameters may encompass virtually any type of parameter associated with the called methods.

At least one report for display may be generated based on the obtained at least one parameter (210). The report generator 124 may be configured to generate one or more reports based on the obtained parameters. For example, the report generator 124 may include a parameter map generator 126 and an analysis unit 128. The parameter map generator 126 may be configured to generate a parameter map based on the obtained parameters. In one embodiment, the parameter map may include a number of key-value pairs, where each key-value pair represents a collected parameter and associated value. In example, the parameter map generator 126 may be configured to populate a parameter map with the parameters obtained by the code extension execution unit 122. The analysis unit 128 may be configured to analyse the parameter map and generate one or more reports based on the analysed parameter map.

Figure 3:
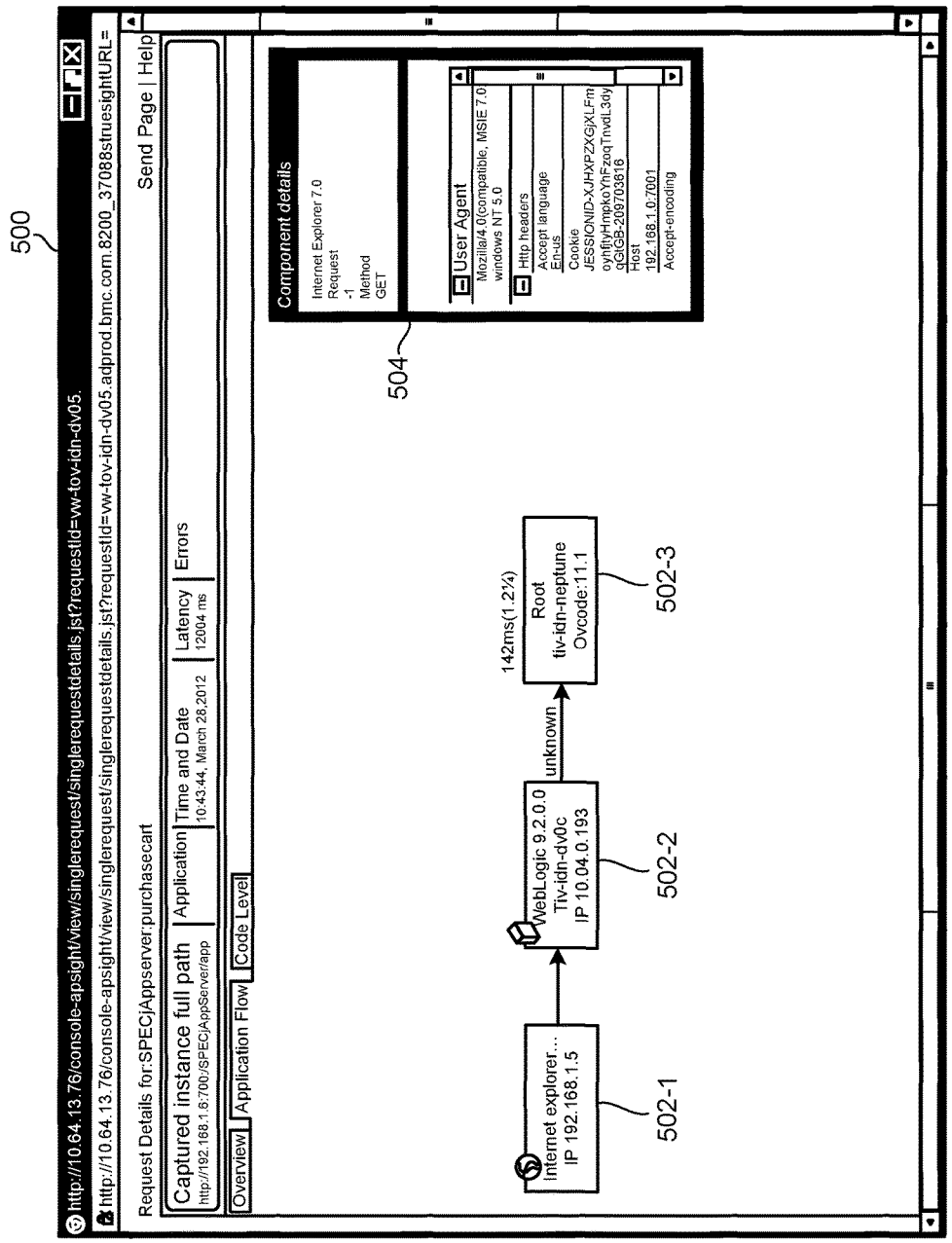
FIG. 3 illustrates an application flow report provided by the application diagnostic apparatus of FIG. 1 according to an embodiment.
Figure 4:
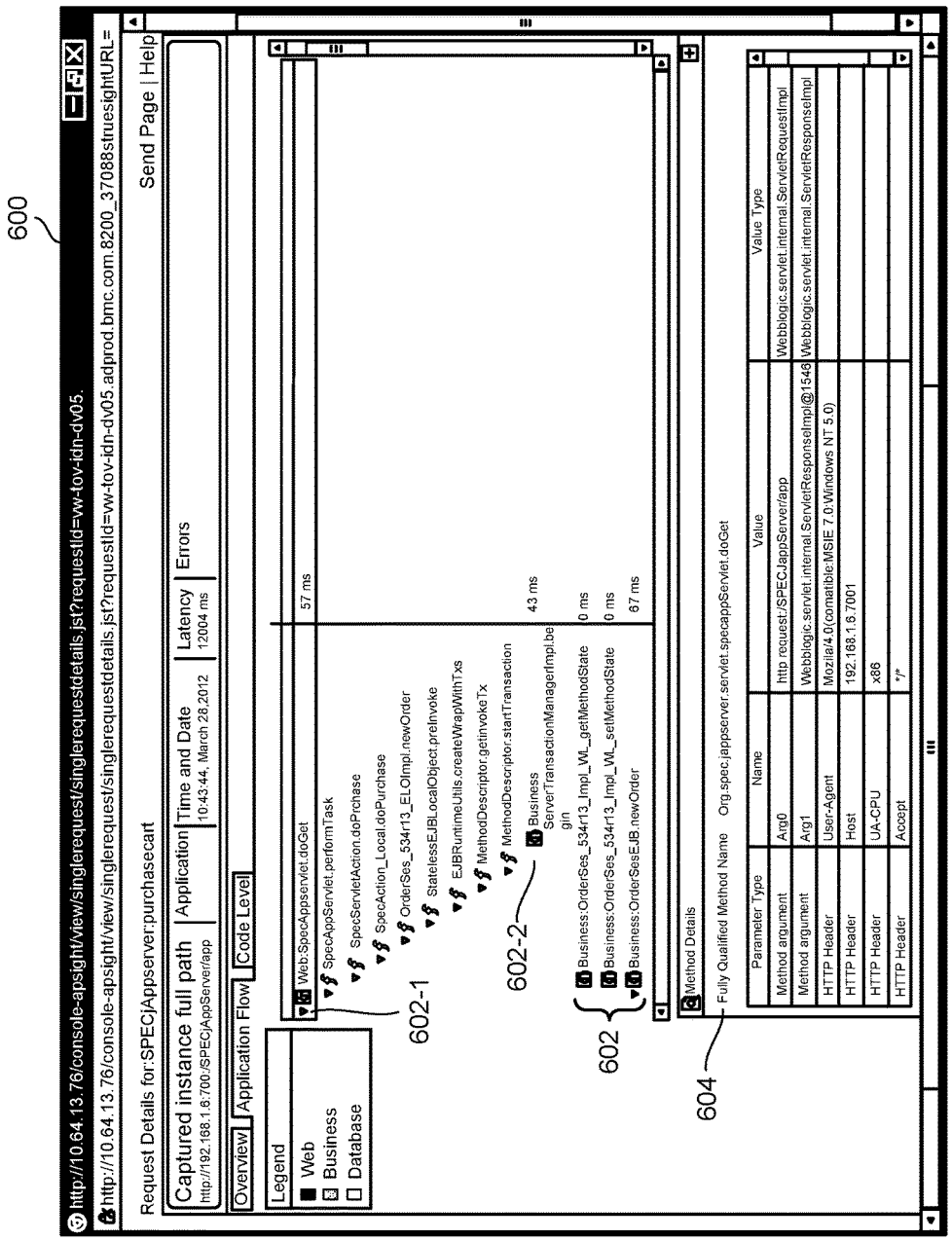
FIG. 4 illustrates a code level report provided by the application diagnostic apparatus of FIG. 1 according to an embodiment.
Figure 5:
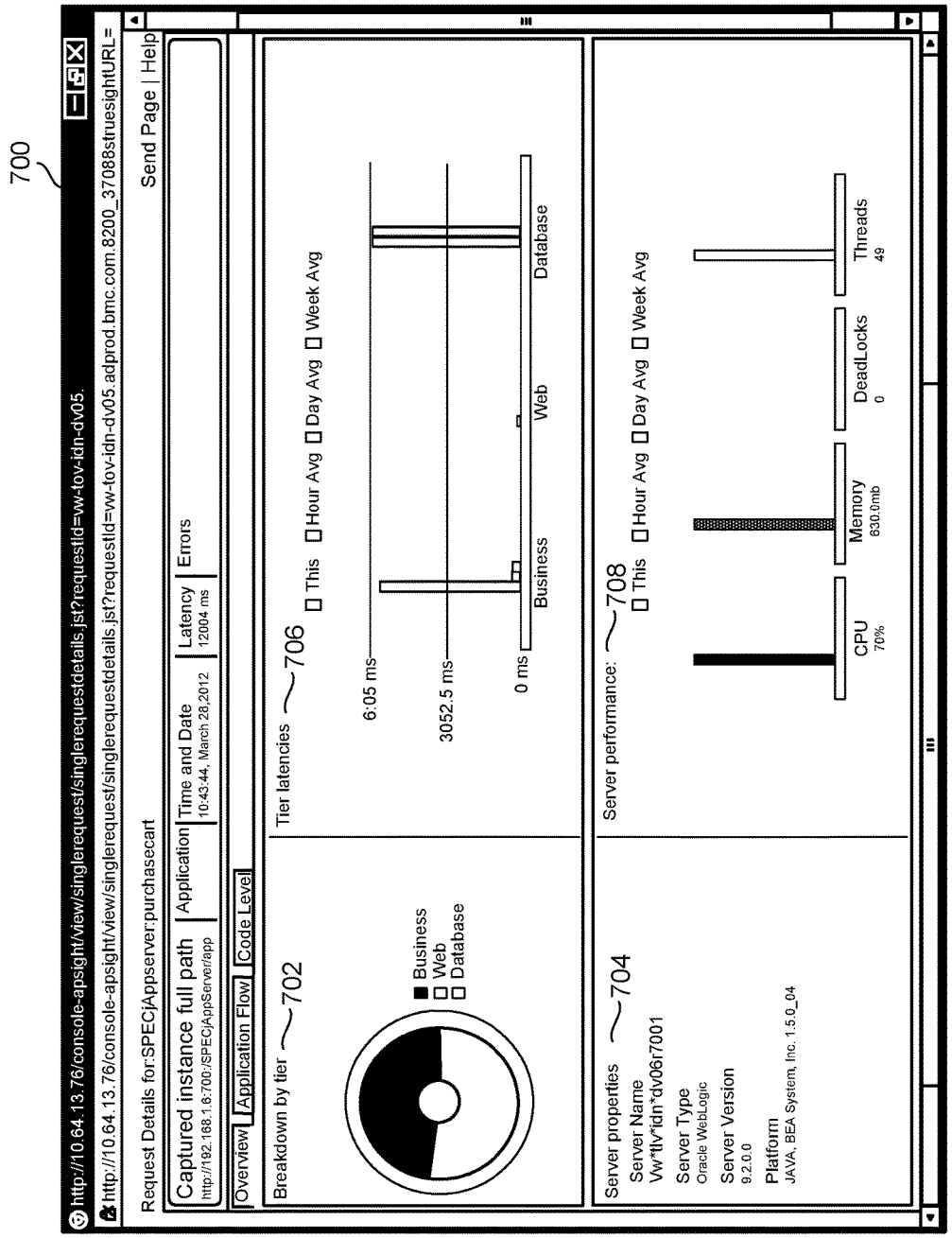
FIG. 5 illustrates an overview report provided by the application diagnostic apparatus of FIG. 1 according to an embodiment.

FIGS. 3-5 illustrate screen shots 500, 600, 700 depicting example reports generated by the report generator 124 for display according to the embodiments. For example, the information provided in the screen shots 500, 600, 700 may have been collected using the code extensions 116 described above. The screen shots 500, 600, 700 provide general information regarding the call chain of a particular server request such as the captured instance full path, the time and date, the latency and whether the call chain encountered any errors. Further, according to the embodiments, the report generator 124 may generate an overview report, an application flow report, and a code level report.

FIG. 3 illustrates the application flow report generated by the report generator 124 according to an embodiment. The application flow report includes detailed information regarding each flow component 502 of the application flow such the identity of each flow component (e.g., 502-1, 502-2 and 502-3). In addition, the application flow report may include detailed information 504 regarding each application flow component. In the example of FIG. 4, the detailed information 504 includes information regarding the application component 502-1 such as the identified methods, information regarding the user agents, and other attributes of the application flow component such as the language, cookies, host and encoding.

FIG. 4 illustrates the code level report generated by the report generator 124 according to an embodiment. The code level report includes detailed information regarding each called method 602. In addition, the code level report may provide detailed information regarding each task within a particular method as such as the tasks listed with respect to called method 602-1. In addition, the code level report may provide information regarding the amount of time that was required to execute each called method 602. Further, the code level report may provide a parameter table 604 for a particular called method, which may provide the arguments and/or return values as well as other contextual information.

FIG. 5 illustrates the overview report generated by the report generator 124 according to an embodiment. The overview report may provide high level information regarding the performance of the application 104. For example, the overview report may provide a breakdown by tier 702, server properties 704, tier latencies 706 and server performance 708. With respect to the breakdown by tier component 702, this section may provide information regarding the usage across different tiers such as the business tier, web tier and database tier. With respect to the server properties component 704, this section may provide the server name, the server type, the server version and platform, as well as any other type of information regarding the server. With respect to the tier latencies component 706, this section may provide an overview of the latencies that occurred within each tier in the form of a graph. It is noted that the embodiment may encompass any type of graphical representation of the collected parameters that is known in the art. With respect to the server performance component 708, this section may provide the amount of usage of each server component such as the computer processing unit (CPU), memory unit, deadlocks and/or threads across various time intervals such as hour, day or week, for example.

In summary, the application diagnostics apparatus 102 may allow a user to dynamically extend the functionality of an application diagnostics module via one or more code extension 116 within the instrumentation file 106. The instrumentation file 106 may specify, in part, which methods are monitored and which methods are associated with the code extension. The code extension 116 itself provides the logic for performing one or more data collection processes such as the capturing of parameters (e.g., key parameter indicators (KPIs)) as well as potentially altering the application flow itself during runtime of the application. The code extensions 116 may be able to dynamically insert themselves into the application 104 in an accurate manner (e.g., loaded with an appropriate class loader—120) without the need to restart the application 104. Also, developers of the code extensions 116 do not necessarily have to have in-depth knowledge of the instrumentation engine. Rather, the development of the code extensions 116 may be accomplished via the extensions code interface 132, and, when implemented, may permit virtually any programmer with sufficient domain knowledge to create and maintain the code extensions 116 without requiring in-depth knowledge of the inner workings of the instrumentation engine, which is generally a highly complex component. The information collected by the code extensions 116 maybe analyzed and presented to the user in the form of reports that may provide useful insight in evaluating the performance of the application 104 such as the amount of time to execute certain method calls, the arguments and/or return values for the methods calls, and/or other information such as the latencies within each tier of the application 104 and other server performance metrics. In short, the application diagnostics apparatus 102 may have the ability to provide customized instrumentation (e.g., code extensions) that are implemented on the fly without requiring in-depth expertise of the instrumentation engine and without being invasive to the operation of the application 104.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art.

What is claimed is:

1. An application diagnostics apparatus comprising:
   at least one processor;
   a non-transitory computer-readable storage medium including instructions executable by the at least one processor, the instructions configured to implement,
   an instrumentation engine to:
      monitor a plurality of methods of a call chain of an application in response to one or more server requests according to an instrumentation file by interjecting code at either of an entry or an exit of each of the plurality of methods and monitoring the plurality of methods during runtime of the application, the plurality of methods including a first method and a second method, the application being associated with a plurality of hierarchal class loaders, the instrumentation file identifying the first method and the second method;
      collect data about an execution of the application including collecting information about the first method and the second method, the instrumentation file also identifying a code extension and a location of the code extension, the instrumentation file associating the code extension with the first method;
   a class loading unit to:
      bypass class loading delegation to a class loader located downstream in the plurality of hierarchal class loaders;
      select a class loader among the plurality of hierarchal class loaders that was used to load the application is selected; and
      load the code extension into the application from the location using the selected class loader when the first method is called within the call chain, without having to restart the application; and
   a code extension execution unit to execute the code extension to collect information about the execution of the application that is different from or an addition to the collected information about the first method and the second method.

2. The application diagnostics apparatus of claim 1, further comprising:
   a code extension updating unit to receive a change to the code extension via a code extension interface, and update the code extension based on the change such that the change is implemented without having to restart the application.

3. The application diagnostics apparatus of claim 1, wherein the instrumentation file identifies a name of the code extension within a rule of the instrumentation file that corresponds to the first method.

4. The application diagnostics apparatus of claim 1, wherein the code extension is stored in a resource file, the resource file includes a Java Archive (JAR) file, the location of the code extension identified in the instrumentation file is a location of the code extension within the JAR file.

5. The application diagnostics apparatus of claim 1, wherein the instrumentation file includes a plurality of rules including a first rule and a second rule, the first rule identifying the first method, and the second rule identifying the second method, the first rule being associated with the code extension, the second rule not being associated with the code extension.

6. The application diagnostics apparatus of claim 1, wherein the code extension defines a new key performance indicator (KPI) about the execution of the application that is in addition to KPIs defined by the instrumentation file.

7. The application diagnostics apparatus of claim 1, wherein the code extension is a first code extension, the instrumentation file associating a second code extension with the second method, the second code extension to alter a sequence of the plurality of methods of the call chain.

8. The application diagnostics apparatus of claim 1, wherein the code extension is a first code extension, the instrumentation file associating a second code extension with the second method, the second code extension to modify a user interface of the application.

9. The application diagnostics apparatus of claim 1, wherein the collected information includes metrics about the execution of the first method and the second method within the call chain.

10. The application diagnostics apparatus of claim 1, further comprising:
a parameter map generator to generate a parameter map based on the collected information relating to both the instrumentation file and the code extension, the parameter map including at least one key-value pair representing a parameter and associated value; and
an analysis unit to analyze the parameter map and generate at least one report based on the analyzed parameter map.

11. A method for extending a functionality of an application diagnostic s system, the method being performed by at least one processor, the method comprising:
monitoring a plurality of methods of a call chain of an application in response to one or more server requests according to an instrumentation file by interjecting code at either of an entry and an exit of each of the plurality of methods and monitoring the plurality of methods during runtime of the application, the application being associated with a plurality of hierarchal class loaders, the plurality of methods including a first method and a second method, the instrumentation file identifying the first method and the second method,
wherein the monitoring includes collecting data about an execution of the application by collecting information about the first method and the second method, the instrumentation file also identifying a code extension and a location of the code extension, the instrumentation file associating the code extension with the first method;
selecting a class loader among the plurality of hierarchal class loaders, the selecting including bypassing class loading delegation to a class loader located downstream in the plurality of hierarchal class loaders such that the class loader that was used to load the application is selected;
loading the code extension into the application using the selected class loader from the location when the first method is called within the call chain, without having to restart the application; and
executing the code extension to collect information about the execution of the application that is different or an addition to the collected information about the first method and the second method.

12. The method of claim 11, further comprising:
receiving, via a code extension interface, a change to the code extension; and
updating the code extension based on the change such that the change is implemented without having to restart the application.

13. The method of claim 11, wherein the code extension is a first code extension, the instrumentation file associating a second code extension with the second method, the second code extension to alter a sequence of the plurality of methods of the call chain.

14. The method of claim 11, wherein the instrumentation file identifies a name of the code extension within a rule of the instrumentation file, the rule being associated with the first method.

15. The method of claim 11, wherein the code extension is stored in a resource file, the resource file including a Java Archive (JAR) file.

16. A non-transitory computer-readable medium storing instructions that when executed cause at least one processor to extend a functionality of an application diagnostics system, the instructions comprising instructions to:
monitor a plurality of methods of a call chain of an application in response to one or more server requests according to an instrumentation file by interjecting code at either of an entry or an exit of each of the plurality of methods and monitoring the plurality of methods during runtime of the application, the application being associated with a plurality of hierarchal class loaders, the plurality of methods including a first method and a second method, the instrumentation file identifying the first method and the second method,
wherein the instructions to monitor include instructions to collect data about an execution of the application by collecting information about the first method and the second method identified in the instrumentation file, the instrumentation file also identifying a code extension and a location of the code extension, the instrumentation file associating the code extension with the first method;
select a class loader among the plurality of hierarchal class loaders, the selecting including bypassing class loading delegation to a class loader downstream in the plurality of hierarchal class loaders such that the class loader that was used to load the application is selected;
load the code extension into the application using the selected class loader from the location when the first method is called within the call chain, without having to restart the application; and
execute the code extension to collect information about the execution of the application that is different or an addition to the collected information about the first method and the second method.

17. The non-transitory computer-readable medium of claim 16, wherein the code extension is to modify the collection of the data indicated by the instrumentation file.

18. The non-transitory computer-readable medium of claim 16, wherein the code extension defines a new key performance indicator (KPI) about the execution of the application that is in addition to KPIs defined by the instrumentation file.

19. The non-transitory computer-readable medium of claim 16, wherein the instrumentation file includes a plurality of rules, and priority information indicating a priority of each of the plurality of rules, the plurality of rules including two rules that relate to the first method, wherein one of the two rules are selected based on the priority information.

* * * * *

UNITED STATES PATENT AND TRADEMARK OFFICE
CERTIFICATE OF CORRECTION

PATENT NO. : 10,372,586 B2  
APPLICATION NO. : 15/005550  
DATED : August 6, 2019  
INVENTOR(S) : Hulick, Jr.

Page 1 of 1

It is certified that error appears in the above-identified patent and that said Letters Patent is hereby corrected as shown below:

In the Claims

In Column 16, Claim 1, Line 26, delete "unit to" and insert -- unit configured to --, therefor.

In Column 16, Claim 2, Line 33, delete "unit to" and insert -- unit configured to --, therefor.

In Column 16, Claim 7, Line 61, delete "extension to" and insert -- extension configured to --, therefor.

In Column 16, Claim 8, Line 66, delete "extension to" and insert -- extension configured to --, therefor.

In Column 17, Claim 10, Line 7, delete "generator to" and insert -- generator configured to --, therefor.

In Column 17, Claim 10, Line 12, delete "unit to" and insert -- unit configured to --, therefor.

In Column 17, Claim 11, Line 16, delete "diagnostic s" and insert -- diagnostics --, therefor.

In Column 17, Claim 13, Line 58, delete "extension to" and insert -- extension configured to --, therefor.

In Column 18, Claim 17, Line 45, delete "is to" and insert -- is configured to --, therefor.

Signed and Sealed this  
Fourth Day of February, 2020

Andrei Iancu  
*Director of the United States Patent and Trademark Office*